United States Patent
Park

(10) Patent No.: US 6,628,659 B1
(45) Date of Patent: Sep. 30, 2003

(54) ATM CELL SWITCHING SYSTEM

(75) Inventor: Joong-Hyeok Park, Suwon (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/150,745

(22) Filed: Sep. 10, 1998

(30) Foreign Application Priority Data

Sep. 10, 1997 (KR) ........................... 1997-46621

(51) Int. Cl.[7] ............................................. H04L 12/28
(52) U.S. Cl. ............................................... 370/395.6
(58) Field of Search .................. 370/352, 353, 370/395.6, 395.61, 395.64, 465, 466, 467, 473, 474

(56) References Cited

U.S. PATENT DOCUMENTS

| | | | | |
|---|---|---|---|---|
| 5,200,952 A | * | 4/1993 | Bernstein et al. | 370/466 |
| 5,327,421 A | * | 7/1994 | Hiller et al. | 370/395 |
| 5,600,643 A | * | 2/1997 | Robrock, II | 370/399 |
| 5,859,850 A | * | 1/1999 | Lien | 370/396 |
| 5,920,559 A | * | 7/1999 | Awaji | 370/392 |
| 5,995,516 A | * | 11/1999 | Iwasaki et al. | 370/466 |
| 6,151,325 A | * | 11/2000 | Hluchyj | 370/398 |
| 6,205,143 B1 | * | 3/2001 | Lemieux | 370/395 |

FOREIGN PATENT DOCUMENTS

| | | |
|---|---|---|
| EP | 0 749 260 A2 | 12/1996 |
| EP | 0 777 395 A1 | 6/1997 |

* cited by examiner

Primary Examiner—Chau Nguyen
Assistant Examiner—Jasper Kwoh
(74) Attorney, Agent, or Firm—Fleshner & Kim, LLP

(57) ABSTRACT

An ATM cell switching system is disclosed. The system includes more than one node connected between a highway transmitting a subscriber data and a high speed line of an ATM type for implementing a converting operation between the subscriber data and an ATM cell, and an ATM switching unit for receiving an ATM cell from one among the nodes through the high speed link, judging a destination based on a header information and routing the ATM cell to another one among the nodes.

19 Claims, 9 Drawing Sheets

FIG. 5

GROUP 1

| Address | |
|---|---|
| 0x000~03F | CH # 0 (HW 0~31) |
| 0x040~07F | CH # 1 (HW 0~31) |
| 0x080~0BF | CH # 2 (HW 0~31) |
| 0x0C0~0FF | CH # 3 (HW 0~31) |
| 0x100~13F | CH # 4 (HW 0~31) |
| 0x140~17F | CH # 5 (HW 0~31) |
| 0x180~1BF | CH # 6 (HW 0~31) |
| 0x1C0~1FF | CH # 7 (HW 0~31) |
| ⋮ | |
| 0x740~77F | CH # 5 (HW 0~31) |
| 0x780~7BF | CH # 6 (HW 0~31) |
| 0x7C0~7FF | CH # 7 (HW 0~31) |

GROUP 2

| Address | |
|---|---|
| 0x800~83F | CH # 0 (HW 0~31) |
| 0x840~87F | CH # 1 (HW 0~31) |
| 0x880~8BF | CH # 2 (HW 0~31) |
| 0x8C0~8FF | CH # 3 (HW 0~31) |
| 0x900~93F | CH # 4 (HW 0~31) |
| 0x940~97F | CH # 5 (HW 0~31) |
| 0x980~9BF | CH # 6 (HW 0~31) |
| 0x9C0~9FF | CH # 7 (HW 0~31) |
| ⋮ | |
| 0xF40~F7F | CH # 5 (HW 0~31) |
| 0xF80~FBF | CH # 6 (HW 0~31) |
| 0xFC0~FFF | CH # 7 (HW 0~31) |

FIG. 6

| Addr | Byte 0 | Byte 1 | Addr | Byte 0 | Byte 1 |
|---|---|---|---|---|---|
| 0x00 | HW # 0_0 | HW # 0_1 | 0x01 | HW # 0_2 | HW # 0_3 |
| 0x02 | HW # 1_0 | HW # 1_1 | 0x03 | HW # 1_2 | HW # 1_3 |
| 0x04 | HW # 2_0 | HW # 2_1 | 0x05 | HW # 2_2 | HW # 2_3 |
| 0x06 | HW # 3_0 | HW # 3_1 | 0x07 | HW # 3_2 | HW # 3_3 |
| 0x08 | HW # 4_0 | HW # 4_1 | 0x09 | HW # 4_2 | HW # 4_3 |
| 0x0A | HW # 5_0 | HW # 5_1 | 0x0B | HW # 5_2 | HW # 5_3 |
| ⋮ | | | ⋮ | | |
| 0x3A | HW # 1D_0 | HW # 1D_1 | 0x3B | HW # 1D_2 | HW # 1D_3 |
| 0x3C | HW # 1E_0 | HW # 1E_1 | 0x3D | HW # 1E_2 | HW # 1E_3 |
| 0x3E | HW # 1F_0 | HW # 1F_1 | 0x3F | HW # 1F_2 | HW # 1F_3 |

FIG. 8

| | 31 30 29 28 27 26 25 24 | 23 22 21 20 19 18 17 16 | 15 14 13 12 11 10 9 8 | 7 6 5 4 3 2 1 0 |
|---|---|---|---|---|
| 0x00~03 | CSI | SN | SNP | |
| 0x04~07 | PAYLOAD 0~3 | | | |
| ... | | | | |
| 0x2C~2F | PAYLOAD 40~43 | | | |
| 0x30~33 | APV | FT | WR/BP | CP | SN | DR_ID | ✕ | APL |
| 0x34~37 | | | WPTR | WCNT |
| 0x38~3B | CSM_OPN (DESTINATION NODE BIT) | CPU | COM | HW# | DESTINATION CH # | DEST_H/W # |
| 0x3C~3F | CSM_OPN (DESTINATION NODE BIT) | CPU | COM | HW# | DESTINATION CH # | DEST_H/W # |
| 0x40~43 | CSI | SN | SNP | |
| 0x44~47 | PAYLOAD 0~3 | | | |
| ... | | | | |
| 0x6C~6F | PAYLOAD 40~43 | | | |
| 0x70~73 | DTMF 1st Byte (A) | DTMF 2nd Byte (A) | DTMF 3rd Byte (A) | DTMF 4th Byte (A) |
| 0x74~77 | DTMF 1st Byte (B) | DTMF 2nd Byte (B) | DTMF 3rd Byte (B) | DTMF 4th Byte (B) |
| 0x78~7B | RESERVED | | | |
| 0x7C~7F | | | | CCQ |

FIG. 12

| 7 | 6 | 5 | 4 | 3 | 2 | 1 | 0 |
|---|---|---|---|---|---|---|---|
| DESTINATION NODE INDICATOR |||||||||
| DESTINATION NODE INDICATOR |||||||||
| CPU | X | X | X | SOURCE NODE # ||||
| CELL SEQUENCE NUMBER |||| PAYLOAD TYPE ||| X |
| H E C |||||||||
| PAYLOAD(48Byte) |||||||||

ATM CELL SWITCHING SYSTEM

BACKGROUND OF THE INVENTION

1. Field of the Invention

The present invention relates to an ATM (Asynchronous Transfer Mode) cell switching system, and in particular to an ATM cell switching system which is implemented using a novel ATM cell switching technique.

2. Description of the Conventional Art

FIG. 1 is a block diagram illustrating a conventional line switching system.

As shown therein, the conventional line switching system includes a plurality of sub-switching systems 10-1 through 10-n for switching local calls, and a main switching system 20 for controlling the whole switching systems and switching a global call among the sub-switching systems 10-1 through 10-n.

The sub-switching system 10-1 through 10-n each include a local CPU (Central Processing Unit) 11 for judging whether a subscriber's call is a local call or a global call, a local switching unit 12 for switching a local call in accordance with a result of the judgement, and a multiplexor/demultiplexor 13 connected between the local switching unit 12 and a link for multiplexing/demultiplexing the global call.

In addition, the main switching system 20 includes a main CPU 21 for managing all call information and a database, a main switching unit 22 for switching the global call in accordance with a control of the main CPU 21, and multiplexor/demultiplexors 23-1 through 23-n corresponding with the sub-switching systems 10-1 through 10-n.

The local switching unit 12 is formed of a time switch, and the main switching unit 22 is formed of a time switch or a space switch. In addition, the time switch has a switching capacity corresponding to the number of subscribers, and the local and main switching units 12 and 22 are connected through a link.

The call set-up procedure of the conventional line switching system will be explained with reference to FIG. 1.

First, the local call of the sub-switching system 10-1 and the global call between two sub-switching systems 10-1 and 10-2 will be explained.

1. Local Call

When a call generated by a subscriber 1 is inputted into the sub-switching system 10-1 through a PCM (Pulse Code Modulation) highway (hereinafter called as a highway) of 2 Mbps, the local CPU 11 judges whether the call corresponds to a global call between the sub-switching systems or a local call in each sub-switching system. At this time, the call judgement is implemented by detecting a key input, etc. of the subscriber.

As a result of the judgement, if the call is a local call, the local CPU 11 controls a time switch of the local switching unit 12 and outputs a corresponding setup information to the main CPU 21 of the main switching system 20 through a control line 33, so that the main CPU 21 controls the switching state of the sub-switching system 10-1. Therefore, a communication between the subscriber 1 and the subscriber n of the sub-switching system 10-1 is implemented based on a switching operation of the local switching unit 12.

2. Global Call

In addition, as a result of the judgement, the call is a global call between the sub-switching systems 10-1 and 10-2, the local CPU 11 controls the local switching unit 12, and an identification number of the subscriber 1 and an identification number of the subscriber n are informed to the main CPU 21 through the control line 33. Therefore, an audio data of the subscriber 1 switched by the local switching unit 12 is inputted into the multiplexor/demultiplexor 13 through a highway 31, and the multiplexor/demultiplexor 13 multiplexes an audio data and transmits to the main switching system 20 through the link 32.

At this time, the main CPU 21 of the main switching system 20 receives the identification numbers of the subscribers 1 and n inputted through the control line 33 and then recognizes the sub-switching system 10-2 of the subscriber n from the database for thereby controlling the main switching unit 22 and outputting an identification number of the subscriber n to the sub-switching system 10-2 through the control line 33. In addition, the multiplexor/demultiplexor 23-1 demultiplexes the audio data of the subscriber 1 inputted through the link 32 and outputs to the main switching unit 22.

Therefore, the main switching unit 22 switches a corresponding highway 31 in accordance with a control of the main CPU 21, and the audio data of the subscriber 1 demultiplexed by the multiplexor/demultiplexor 23-1 is demultiplexed again by the multiplexor/demultiplexor 23-2 and then is transmitted to the sub-switching system through the link 32.

The local CPU 11 of the sub-switching system 10-2 controls the local switching unit 12 in accordance with an identification information of the subscriber n inputted from the main CPU 21, so that the highway 31 connected with the link 32 and the highway 31 connected with the subscriber are switched through the multiplexor/demultiplexor 13 for thereby forming a communication line (Global call setup), and thus the audio data of the subscriber 1 demultiplexed by the multiplexor/demultiplexor 13 is transferred to the subscriber n. In addition, the local CPU 11 outputs a corresponding Setup completeness information to the main CPU 21 through the control line 33.

Therefore, a communication between the subscriber 1 of the switching system 10-1 and the subscriber n of the sub-switching system 10-2 is implemented through the above-described cell setup procedure. In addition, a local call between the sub-switching systems 10-3 through 10-n and a global call between the sub-switching systems 10-3 through 10-n and the main switching system 20 are implemented in the above-described manner.

However, the conventional line switching system has the following problems.

First, in the conventional line switching system, since a switching speed between the main switching unit and the local switching unit is 2 Mbps, a multimedia service requiring a high speed switching operation is not implemented.

Second, the conventional line switching system has additional control line. In particular, in order to implement a non-blocking line switching operation, the time switches of the main switching system and the sub-switching system should have a predetermined switching capacity corresponding to the number of subscribers. Therefore, the number of switching boards is increased for thereby complicating a system structure and increasing the price.

Third, the conventional line switching system has a plurality of local CPUs for thereby enabling a distributed control structure. However, in the conventional line switching system, since the main CPU manages all call information and a database inputted from the local CPU, the distributed control structure is not fully implemented. As a result, if an error occurs in the main CPU, the whole system may go down for thereby causing inconvenience and degrading the performance of the system.

Fourth, even though the conventional line switching system is capable of processing a large capacity data using a main switching unit, a switching capacity corresponding to the whole number of lines is not implemented due to a high price and limited installation space. As a result, in the case of the global call, since a blocking switch operation is not implemented due to the limited capacity of the switching operation, a traffic may be affected for thereby decreasing a reliability of the system.

SUMMARY OF THE INVENTION

Accordingly, it is an object of the present invention to provide an ATM cell switching system which overcomes the aforementioned problems encountered in the conventional art.

It is another object of the present invention to provide an ATM cell switching system which is capable of implementing various multimedia services based on a high speed switching operation by adapting an ATM cell switching technique to a conventional line switching system.

It is still another object of the present invention to provide an ATM cell switching system which is capable of implementing a simple structure and a complete distributed control structure using an ATM cell switching technique.

It is still another object of the present invention to provide an ATM cell switching system which operates irrespective of a traffic by switching global and local calls based on a non-blocking method.

To achieve the above objects, there is provided an ATM cell switching system according to a first embodiment of the present invention which includes more than one node connected between a highway transmitting a subscriber data and a high speed line of an ATM type for implementing a converting operation between the subscriber data and an ATM cell, and an ATM switching unit for receiving an ATM cell from one among the nodes through the high speed link, judging a destination based on a header information and routing the ATM cell to another one among the nodes.

To achieve the above objects, there is provided an ATM cell switching system according to a second embodiment of the present invention which includes a plurality of PCM highways which are a transmission line of TDM type, a plurality of nodes for converting audio data from the PCM highway into an ATM cell or converting the ATM cell into an audio data, a high speed link which is a transmission line of ATM type, and an ATM switching unit connected with a plurality of nodes through the high speed link, respectively, for judging a destination based on a header information of the ATM cell from the nodes and routing a subscriber call.

To achieve the above objects, there is provided an ATM cell switching system according to a third embodiment of the present invention which includes a plurality of PCM highways of a TDM type, a plurality of nodes for switching an audio data from the PCM highway and performing a converting operation between an audio data and an ATM cell, a high speed link of an ATM type, and an ATM switching unit connected with the nodes through the high speed link for routing a subscriber call, said ATM switching unit including a plurality of link interfaces matching with the nodes, and an ATM switch for judging a destination based on a header information of an ATM cell inputted through the link interface unit and routing to the opposite side of the node.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a view illustrating the Tx__Highway buffer and a Rx__Highway buffer of FIG. 3;

FIG. 6 is a view illustrating the channel region of FIG. 5;

FIG. 8 is a detailed view illustrating the cell buffer region of FIG. 7;

FIG. 12 is a view illustrating a packet data cell generated in the SAR of FIG. 4.

DETAILED DESCRIPTION OF THE PREFERRED EMBODIMENTS

Figure 1:
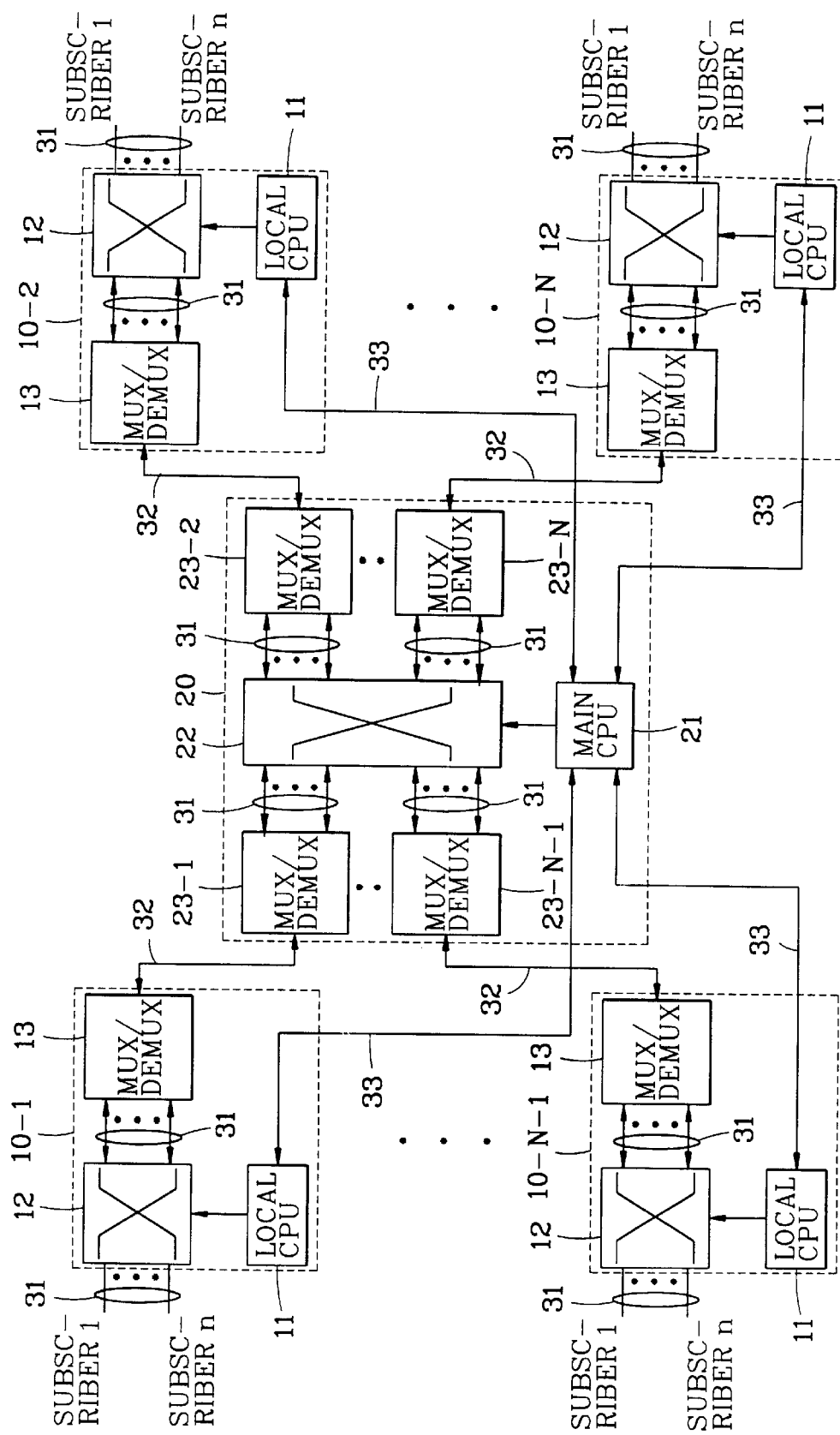
FIG. 1 is a block diagram illustrating a conventional line switching system.
Figure 2:
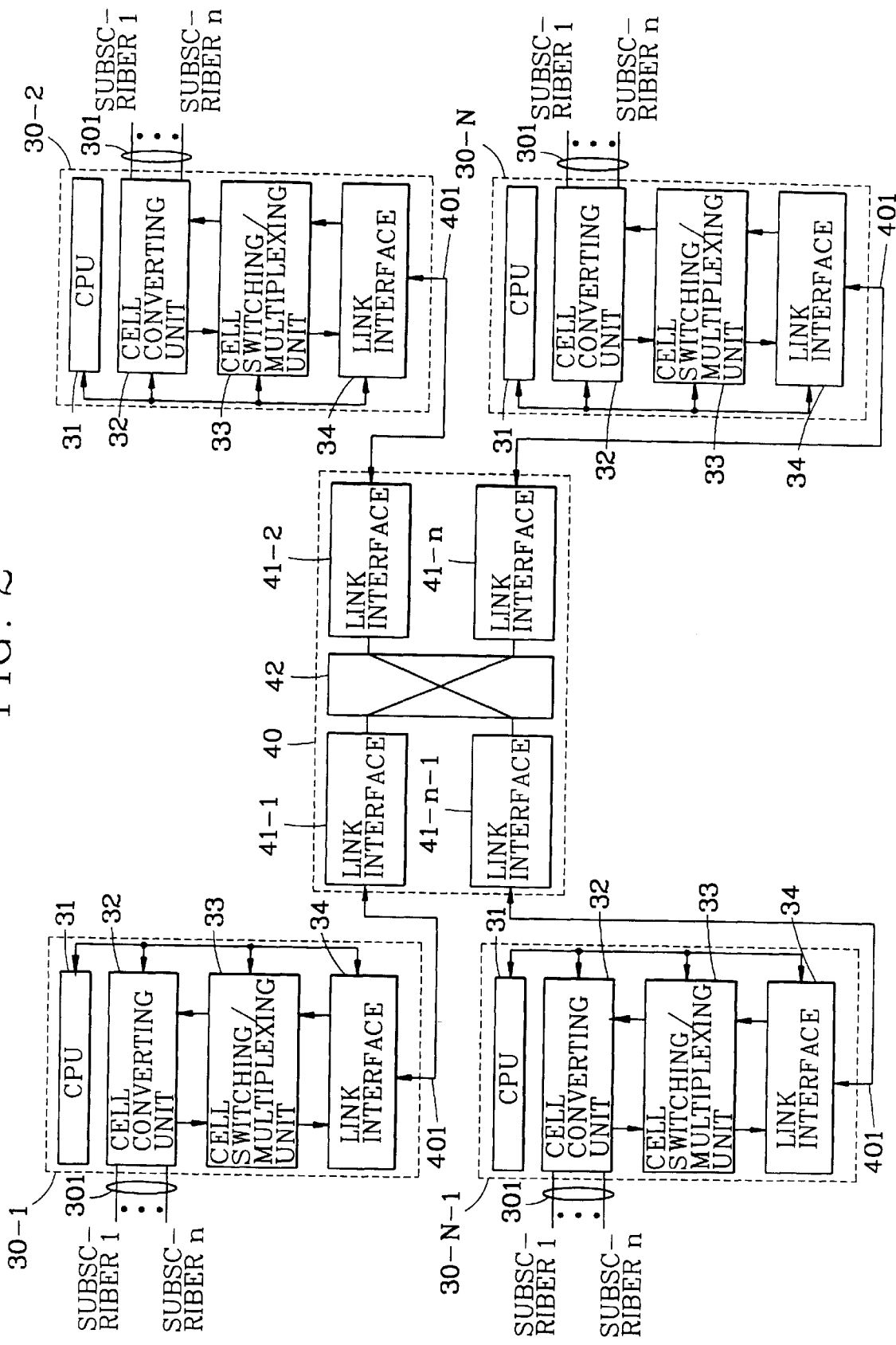
FIG. 2 is a block diagram illustrating an ATM cell switching system according to the present invention.

FIG. 2 is a block diagram illustrating an ATM cell switching system according to the present invention.

As shown therein, the ATM cell switching system according to the present invention includes a plurality of nodes 30-1 through 30-n connected between a PCM type highway 301 and an ATM type 155 Mbps high speed link 401 for performing a converting operation between a subscriber data and an ATM cell, and an ATM switching unit 40 connected with the nodes 30-1 through 30-n through a 155 Mbps high speed link 401 for judging a destination based on a header information of the ATM cells from the nodes 301-through 30-n and routing a subscriber's call.

Each of the nodes 30-1 through 30-n has the same construction and includes a CPU 31, a cell converting unit 32, a cell switching/multiplexing unit 33, and a link interface 34.

The ATM switching unit 40 includes a plurality of link interface units 41-1 through 41-n corresponding to the nodes 30-1 through 30-n, and an ATM switch 42 for judging a header information from an ATM cell through the link interface unit 41-1 through 41-n and outputting the subscriber call to the nodes 30-1 through 30-n, respectively. At this time, the ATM switch 42 includes an ATM cell switching chip.

In addition, the CPU 31 of each of the nodes 30-1 through 30-n judges whether the subscriber's call is a global call or a local call for thereby performing various control operations and outputs a message which is a cell setup information.

The cell converting unit 32 is a module connected between a TDM type transmission line (highway) 301 and an ATM type transmission line (155 Mbps link) 401. The cell converting unit 32 is connected between 32 Tx__Highways 501 and 32 Rx__Highways 502. The frame of each highway is formed of 32 time-slots.

The cell switching/multiplexing unit 33 is connected between the CPU 31, the cell converting unit 32 and the link interface 34 for performing a switching operation of an audio data cell processed in the system and transmitting/receiving a CPU data cell of the CPU 31.

In addition, the link interface 34 includes a STM-1 SONET Framer and is connected between the cell multiplexing/demultiplexing unit 205 and a high speed link 401 for transmitting/receiving an ATM cell.

Figure 3:
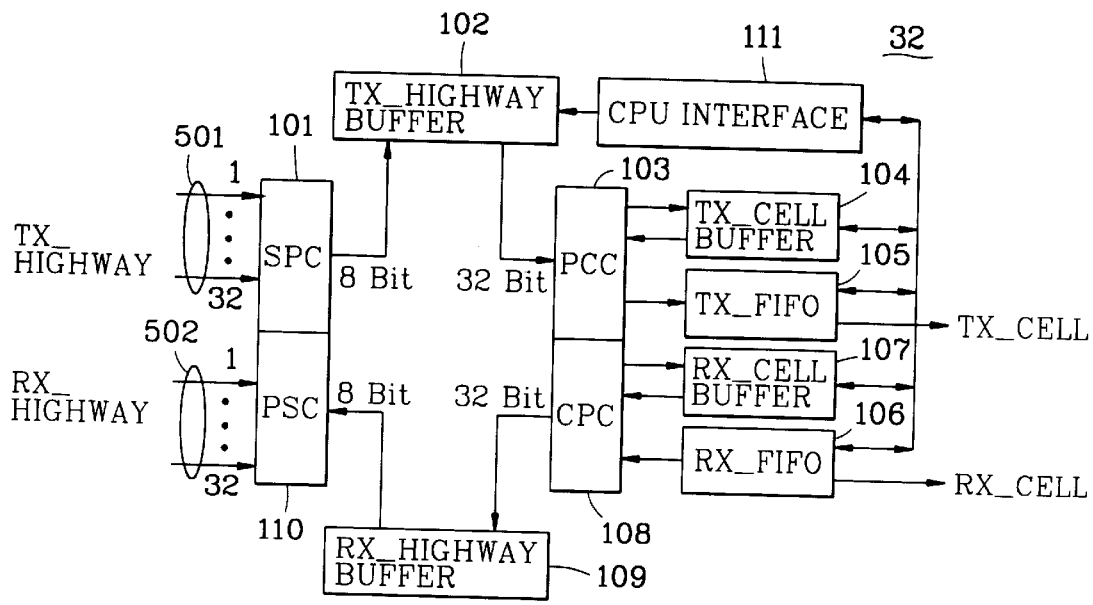
FIG. 3 is a detailed block diagram illustrating the cell converting unit of FIG. 2.

FIG. 3 illustrates the cell converting unit 32.

Since the cell converting unit 32 performs a data conversion in parallel, the connection portion of the Tx_Highway 501 is connected with a SPC 101 (Serial-to-Parallel Converter) and the connection portion of the Rx_Highway 502 is connected with the PSC (Parallel-to-Serial Converter) 101.

The SPC 101 converts 1-bit serial data from 32 Tx_Highways 501 into a 8-bit parallel data and then stores into the Tx_Highway buffer 102 in accordance with a highway number and a channel number and includes 32 serial-to-parallel logic components corresponding to 32 Tx_Highways.

The PCC (PCM-to-Cell Converter) 103 reads a 4-byte data from the Tx_Highway buffer 102 and stores the read data into a corresponding region of the Tx_Cell Buffer 104 in accordance with a highway number and channel number of the read data.

The CPC (Cell-to-PCM Converter) 108 reads 4-byte data from the Rx_Cell buffer 107 in accordance with a highway number and channel number and then stores the read data into the Rx_Highway buffer 109 and stores the audio data cell Rx_Cell inputted through the Rx_FIFO 106 into the Rx_Highway buffer 109 in accordance with a highway number and channel number of a destination of the cell header.

The PSC 110 is a block for converting a 8-bit parallel data into a 1-bit serial data and includes 32 parallel-to-serial logic components corresponding to 32 Rx_Highways 502. The PSC 110 performs a byte alignment in accordance with a highway number, channel number, and frame number for thereby reading a 8-bit parallel data from the Rx_Highway buffer 109.

The CPU interface 111 is a block for interfacing with the CPU 31 and has a 1Kbyte RAM. Therefore, when one message is formed of two long-words (4-byte), the Tx_Queue and Rx_Queue are formed in the RAM, so that it is possible to form Queue for storing 64 messages. Therefore, the CPU 31 edits or reads the control data stored in the Tx_Cell buffer 104.

In more detail, in a state that the CPU 31 is accessible, the CPU interface 111 stores the data formed in the Rx_Queue into the Tx_Cell buffer 104 or reads a data from the Tx_Cell buffer 104 and stores into the Tx_Queue.

Figure 4:
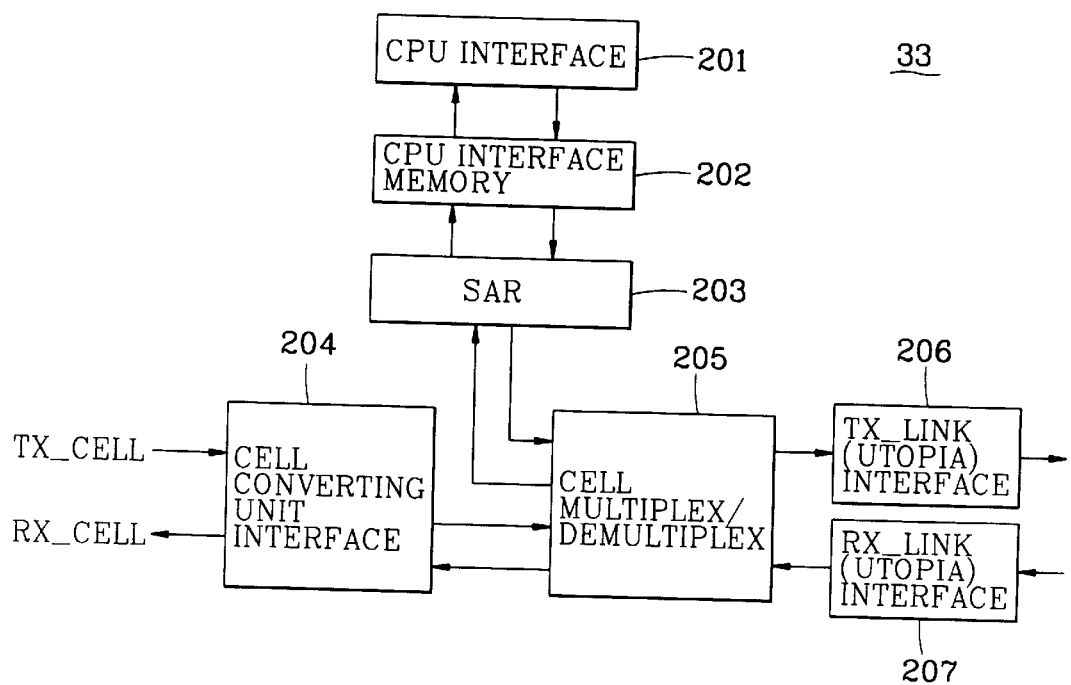
FIG. 4 is a detailed block diagram illustrating the cell switching/multiplexing unit of FIG. 2.

FIG. 4 illustrates the cell switching/multiplexing unit 33.

Figure 11:
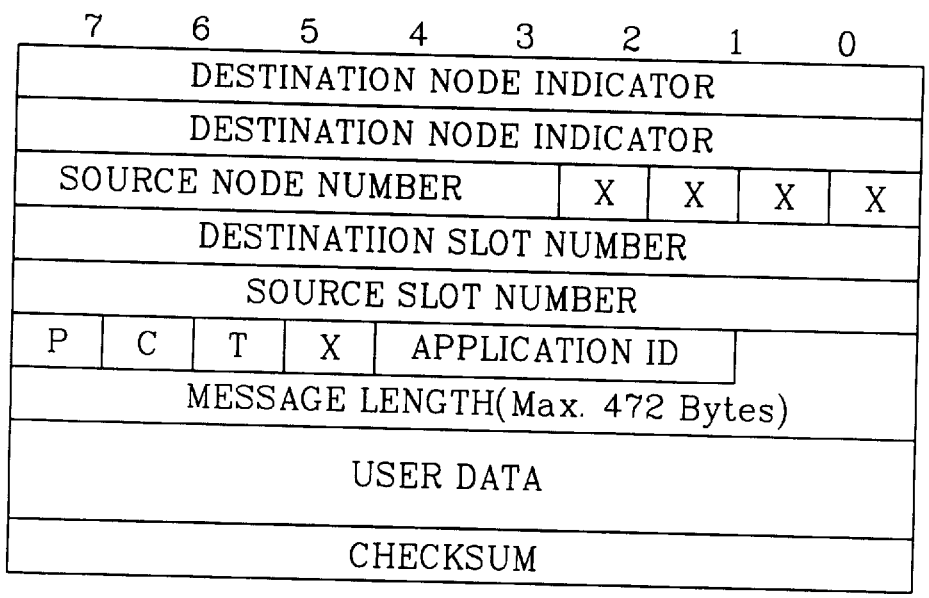
FIG. 11 is a view illustrating the CPU interface memory of FIG. 4.

The CPU interface 201 performs a function for connecting with the CPU, and as shown in FIG. 11, the CPU interface memory 202 stores the cell set-up information, namely, message, from the CPU 31.

The SAR (Segmentation And Reassembly) 203 segments the message stored in the CPU interface memory 202 into 48 in a hardware-based manner and converts into the packet data cell.

The cell converting unit interface 204 switches an audio data cell Tx_Cell from the cell converting unit 32 to the cell converting unit 32, outputs to the link interface unit 34, and transmits an audio data cell among the ATM cells from the ATM switching unit 40 through the link interface unit 34 to the cell converting unit 32. At this time, the interface with the cell converting unit 32 is implemented using a 9-bit FIFO. The 9th bit indicates a start of the cell (SOC). Therefore, the cell converting unit interface 204 recovers a cell alignment error using the SOC bit.

The cell multiplexing/demultiplexing unit 205 multiplexes an audio data cell inputted through the cell converting unit interface 204 and a packet data cell outputted from the SAR 203 for thereby forming an ATM cell and demultiplexes the ATM cell from the ATM switching unit 40 to an audio data cell and a packet data cell.

In addition, the Tx_Link interface 206 and Rx_Link interface 207 performs a UTOPIA Interface function between the cell multiplexing/demultiplexing unit 205 and the link interface unit 34.

The operation of the ATM cell switching according to the present invention will be explained with reference to the accompanying drawings.

First, the local call switched in the node 30-1 and the global call switched between two nodes 30-1 and 30-2 will be explained.

When a call is generated by a subscriber 1, the CPU 31 of the node 30-1 judges whether a corresponding call is a global call or a local call. The cell converting unit 32 converts an audio data of the subscriber 1 inputted through the highway 301 into a cell form based on each Time-slot and outputs to the cell switching/multiplexing unit 33.

The cell converting unit 32 implements a VC (virtual Connection) through an ATM type cell. In more detail, a VP (Virtual Path) and VC (Virtual Channel) are formed using 4-byte except for an error detection/control (HEC) of a header among 5-byte of a cell header.

Namely, the first and second byte is a destination node number (Destination Node Number) using a bit map format and is used for an ATM cell switching chip of the ATM switching unit 40 for thereby forming a VP. In addition, the third and fourth bytes are a destination highway number and a time-slot number using an encode format and is used in the cell converting unit 32 for forming a VC. At this time, the VP may be used for a broadcast with the cell multiplexing/demultiplexing unit 205, and the VC is used for a point-to-point connection.

The cell conversion operation of the cell converting unit 32 will be explained in detail.

As shown in FIG. 3, it is assumed that an audio data of a subscriber 1 is inputted through a Tx_Highway among 32 Tx_Highways 501.

The SPC 101 converts a 1-bit audio data into a 8-bit parallel data based on a serial-to-parallel logic matching with the Tx_Highway 1 and sequentially stores the converted 8-bit parallel data into a corresponding region of the T_Highway buffer 102 in accordance with a highway number and a channel number.

When the Tx_Highway buffer 102 stores a 4-byte audio data into the Tx_Highway buffer 102, a 8-byte storing space is required for one time slot in a highway, so that the PCC 103 reads a 4-byte audio data from the Tx_Highway buffer 102. The storing space is totally 8Kbytes.

FIG. 5 illustrates the Tx_Highway buffer 102 and the Rx_Highway buffer 109.

The Tx_Highway buffer 102 is divided into two groups for the reasons that the PCC 103 accesses the group 2 while the SPC 101 accesses the group 1, and visa versa. In addition, each group is formed of 32 channel regions. Each channel region is formed of 32 highway regions as shown in FIG. 6. At this time, a predetermined highway region is formed of a long-word.

Therefore, in order to form one highway region, since a basic unit (period 125 $\mu$s) of a highway forming 32 channels in synchronization with four frame pulses (8 Khz synchronous pulse) is required, the time corresponding to four frame pulses is required so that the SPC 101 forms the group 1.

The PCC 103 reads an audio data by 4-byte from the group 2 of the Tx_Highway buffer 102 and stores the read data into the Tx_Cell buffer 104 in accordance with a highway number and a channel number for thereby forming an audio data cell. In addition, whenever an audio data cell is generated, the thusly generated data cell is transmitted to the cell switching/multiplexing unit 33 through the Tx_FIFO 105.

Figure 7:
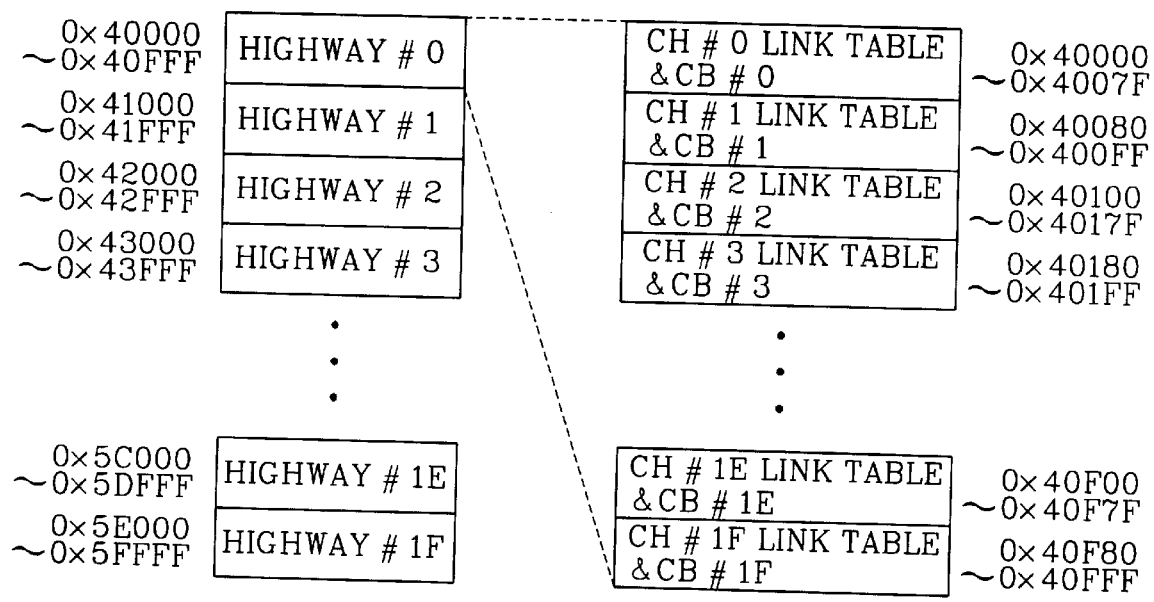
FIG. 7 is a view illustrating the Tx__Cell buffer and the Rx__Cell buffer of FIG. 3.

FIG. 7 illustrates the Tx_Cell buffer 104 and the Rx_Cell buffer 107.

The Tx_Cell buffer 104 is divided into 32 regions (Highway#0 through highway#1 F) based on the highway, and each region is formed of 32 cell buffer regions (CB#0 through CB#1 F).

As shown in FIG. 8, each cell buffer region is formed of a cell buffer control table and a cell buffer in which a 48-byte audio data (payload) is actually stored. At this time, one cell buffer control table is provided for one cell buffer. The Tx_Cell buffer control table has an information for controlling a procedure for moving an audio data stored in the Tx_Highway buffer 102 to the Tx_Cell buffer 104 by the channel, and the Rx_Cell buffer control table has an information for controlling a procedure for storing an audio data cell into the Rx_Cell buffer 107 and moving the data stored in the Rx_Cell buffer 107 to the Rx_Highway buffer 109 by the channel.

Figure 9:
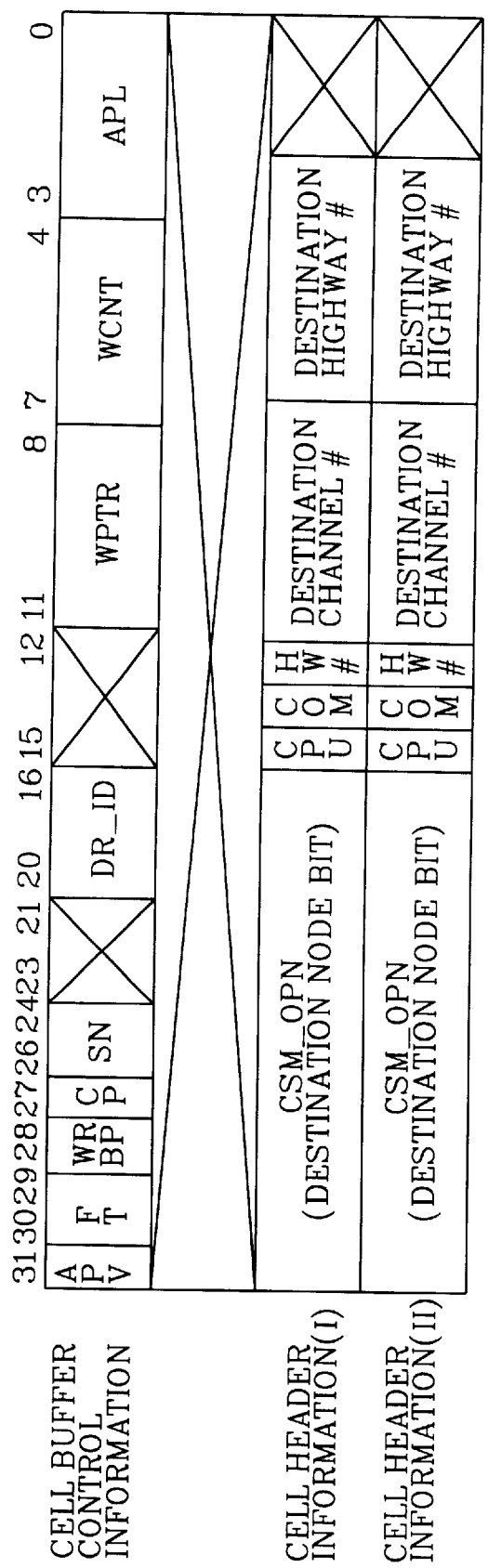
FIG. 9 is a detailed view illustrating the cell buffer control table of FIG. 8.
Figure 10:
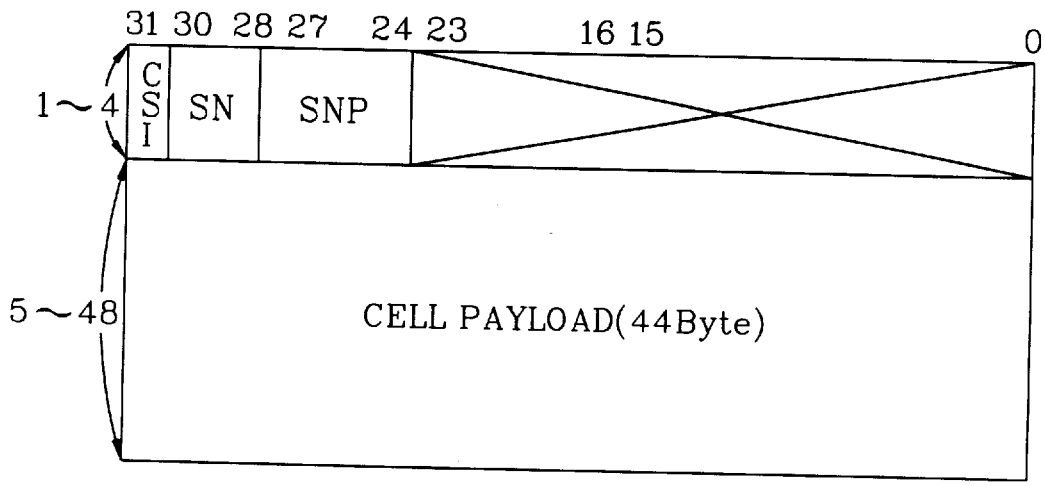
FIG. 10 is a view illustrating the cell buffer of FIG. 8.

FIGS. 9 and 10 illustrate a cell buffer control table and a detailed construction of the cell buffer.

APV(Approval) represents a bit indicating a use approval or use non-approval of a cell buffer.

FT(Function Type) represents a bit for selecting one operation type among four operation types of TOHIC.

WRBP(Write Buffer Pointer) represents a bit indicating a region which is currently being used in the cell buffer formed of two regions.

CP(Copy) represents a bit indicating a point-to-double point connection for transmitting one cell to two destinations.

SN(Sequence number) represents a cell number which is currently being generated. This value is combined with a first byte of the payload when the cell is transmitted.

DR_ID(DTMF Register Identifier) represents a number of DTMF register in which a DTMF (Dual Tone Multifreqency) is stored when FT is "10".

WPTR(Write Pointer) represents a position information by which a data is stored in one cell buffer.

WCNT(Write Count) represents an information indicating a space which is formed up to APL in one cell buffer.

APL(Available Payload Length) represents an information indicating a length of a valid data in a cell payload region.

CSM_OPN(Output Port Number used on switch) represents an information indicating a destination node number.

CPU represents a bit indicating a cell transmitted to the CPU of the destination.

COM represents a bit indicating a cell transmitted to a common buffer.

H/W# represents a highway number of the destination.

CH represents a channel number of the destination.

CSI(Convergence Sublayer Indicator): not used.

SNP(Sequence Number Protection) is used for checking an error of a sequence number.

Therefore, the PCC 103 performs a cell conversion operation in accordance with a state transition of a state machine.

Namely, the PCC 103 reads an audio data by 4 bytes from the group 2 of the Tx_Highway buffer 102 and accesses a control table, so that the cell buffer number corresponding to a highway number and a channel number is read for thereby sequentially storing an audio data into a corresponding cell buffer.

In addition, the WPTR(Write Pointer) and the AOL (Available Payload Length) are read from the cell buffer control table are compared using the read cell buffer number as an access address. As a result of the comparison, the WPTR and APL are identical, the PCC 103 stores a SN(Sequence Number) into the first byte of a corresponding cell buffer for thereby forming one audio data.

Therefore, the cell converting unit 32 converts the audio data on 32 2 Mbps PCM serial data lines (called as Highway) into the cell by the time-slot and converts the cell into the time-slot data on 32 2 Mbps PCM serial data lines (Highway).

The cell switching/multiplexing unit 33 is connected with,the CPU 31 through the CPU interface 201 and performs a UTOPIA interface function for connecting with the STM-1 SONET framer of the link interface 34 through the Tx_Link interface 206 and the Rx_Link interface 207. In addition, the SAR 203 reads a message that the CPU 31 stores into the CPU interface memory 202 and divides into 48-byte data based on the hardware for thereby converting into a packet data cell.

Namely, the CPU 31 stores one message into the CPU interface memory 202, as shown in FIG. 11, through the CPU interface 201 and set the semaphore to "1". Thereafter, the SAR 203 detects the above-described operation and reads a length value of the message from the CPU interface memory 202. In addition, the value obtained by adding 8 to the message length value is determined as a length value of the packet data. Whenever the SAR 203 reads the message from the CPU interface memory 202 by one byte, the length value of the packet data is decreased by "1". When the length value of the packet data becomes "0", the length value of the same is not decreased more. The cell formed at the time when the length of the packet data becomes "0" is the final cell of the packet data.

If the length value of the packet data is not an integer time of 48, the payload portion of the final cell is partially filled. At this time, the SAR 203 fills the remaining portions with "0". In addition, the SAR 203 generates a check-sum value with respect to the whole packet data and adds to the final byte of the last cell.

FIG. 12 illustrates a packet data cell.

The header portion of the cell is generated using a header portion of the packet data. The destination node indicator is capable of displaying maximum 16 destination nodes based on a bit-matching method. The CPU bit is an information that the cell is a packet data cell and is set to "1", and the CPU bit is set to "0" in accordance with an audio data cell generated in COCAH.

In addition, the source node number (source node#) is an information for indicating a transmission nose and is used when the information is stored into the packet buffer memory of the destination. The cell sequence number represents a sequence of the message particles transferred to the cell. Since the cells are not transferred in the reversed order due to the characteristic of the ATM switching unit 40, the cell sequence number is used for detecting the cell loss rather than indicating the sequence of the cell. In addition, the cell sequence number has a value of 0 through 9 since the maximum size of the packet data is 480-byte.

1. Local Call

First, when the call of the subscriber 1 is judged to be a local call by the CPU 31, the cell converting unit interface 204 of the cell switching/multiplexing unit 33 switches an audio data cell (Tx_Cell) received from the cell converting unit 32 to the cell converting unit 32.

The audio data cell Rx_Cell switched to the cell converting unit 32 is sequentially stored into the Rx_Cell buffer 107 through the Rx_FIFO 106, and the CPC 108 reads a 4-byte data from the Rx_Cell buffer 107 in accordance with a highway number and a channel number and stores the thusly read data into the Rx_Highway buffer 109. In addition, the PSC 110 byte-aligns the highway number, channel number and frame number and reads a 8-bit parallel data from the Rx_Highway buffer 109 and converts into a 1-bit serial data.

The 1-bit serial data converted by the PSC 110 is outputted through one (for example, Rx_Highway 1) among the Rx_Highway 502, so that the audio data cell Rx_Cell switched by the switching/multiplexing unit 33 is converted into a time-slot data on the highway and is transmitted to a corresponding subscriber (for example, a subscriber n).

2. Global Call

In addition, if the cell of the subscriber 1 is judged to be a global call by the CPU 31, the cell converting unit interface 204 outputs an audio data cell Tx_Cell from the cell converting unit 32 to the cell multiplexing/demultiplexing unit 205, and the cell multiplexing/demultiplexing unit 205 multiplexes the audio data cell Tx_Cell and the packet data cell from the SAR 203 for thereby forming an ATM cell and outputting through the Tx_Link interface 204. As a result, the ATM cell is transmitted to the ATM switching unit 40 through the link interface 34 and the high speed link 401.

At this time, the cell multiplexing/demultiplexing unit 209 multiplexes the audio data cell and packet data cell based on the statistical TDM method. The cell switching/multiplexing unit 33 receives the cell from the link interface unit 34 through the Rx_Link interface 207 by the unit of 2.8 μs. At this time, the above-described time is called as a cell time slot (CTS), and the pulse signal indicating a boundary of the CTS is called as a CTS synchronous signal.

Namely, the cell multiplexing/demultiplexing unit 205 determines whether the audio data cell Tx_Cell is processed or the packet data cell is processed whenever the CTS synchronous signal is applied. In the case of the cell transfer delay, since the audio data cell is sensitive compared to the packet data cell, the cell multiplexing/demultiplexing unit 205 gives the audio data cell a priority.

In addition, the ATM cell inputted into the ATM switching unit 40 through the high speed link 401 is inputted into the ATM switch 42 through the link interface unit 41-1, and the ATM switch 42 judges a destination using a header information of the ATM cell. Thereafter, the ATM cell is transmitted to the node 30-2 through the link interface unit 41-2 and the high speed link 401, namely, a routing process of the ATM cell.

The ATM cell transmitted to the node 30-2 is inputted into the cell switching/multiplexing unit 33 through the link interface 34, and the cell switching/multiplexing unit 33 demultiplexes the ATM cell to the audio data cell and the packet data cell, so that the packet data cell is inputted into the CPU 31, and the audio data cell is transmitted to the cell converting unit 32.

Namely, the cell multiplexing/demultiplexing unit 205 demultiplexes the ATM cell inputted through the Rx_Link interface 207 to an audio data cell and a packet data cell, and the packet data cell is outputted to the SAR 203, and the audio data cell is transmitted to the cell converting unit 32 through the cell converting unit interface 204.

Therefore, the CPC 108 of the cell converting unit 32 receives the audio data cell Rx_Cell through the Rx_FIFO 106, and the received audio data cell is stored into the Rx_Highway buffer 109 in accordance with a highway number and a channel number of the destination in the header of the audio data cell Rx_Cell, so that the audio data cell Rx_Cell is converted into the time-slot data on the highway, and the converted time-slot data is transmitted to a corresponding subscriber (for example, a subscriber n) through one (for example, Rx_Highway 32) among the Rx_Highway 502 identically to the local call.

Therefore, since the global call is non-blocked by the ATM switching unit 40, a multiplex communication is implemented between the subscriber 1 of the node 301 and the subscriber of the node 30-2.

So far, the local call switched in the node 30-1 and the global call switched between two nodes 30-1 and 30-2 were explained for simplification. The local call and global call in each node are all identically implemented in the above-described manner.

In the present invention, it is possible to implement a high speed switching operation irrespective of a traffic characteristic of an audio data, a motion image and a common data. In addition, the present invention is not limited to a PCM data. Namely, various nodes capable of implementing a multiplex service function with respect to MPEG, ATM, PCS data, etc. ate may be connected in an ATM cell type based on a high speed link of 155 Mbps.

As described above, it is possible to decrease the number of switching boards mounted on the ATM switching unit by adapting the ATM cell switching technique to a conventional line switching system resulting in a simplification of the system and decreasing a fabrication cost.

The call switching operation which is performed by the main CPU in the conventional art is implemented by the CPUs of each node in the present invention for thereby enabling a complete distribution control structure. Therefore, even though an error occurs in the ATM switching unit, the entire system less goes down compared to the conventional art, so that it is possible to enhance the performance of the system and a reliability.

In the present invention, since various nodes capable of implementing a multiplex service function with respect to MPEG, ATM, PCS data, etc. are connected with a high speed link of 155 Mbps for switching in an ATM cell type, it is possible to provide various multimedia services based on a high speed switching operation.

In addition, since all calls are processed on a non-blocking basis, the traffic is not affected, so that a reliability of the system and a satisfaction of the user are enhanced.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An ATM (Asynchronous Transfer Mode) cell switching system comprising:

a plurality of nodes each connected between a highway transmitting a subscriber data and a high speed link which includes an ATM transmission line, and each implementing a converting operation between the subscriber data and an ATM cell; and an ATM switching unit for receiving the converted ATM cell from one of the nodes through the high speed link, judging a destination based on a header information, and routing the converted ATM cell to another one of the nodes, wherein each of sad nodes includes:
a CPU (Central Processing Unit) for judging whether a subscriber call is a local call or a global call;
a cell converting unit for converting the subscriber data to a data cell;
a cell switching/multiplexing unit for returning the data cell inputted from the cell converting unit to the cell converting unit in the case of a local call, and for multiplexing the data cell to form the converted ATM cell in The case of a global call; and
a link interface unit for outputting the converted ATM cell from the cell switching/multiplexing unit to the high speed link.

2. The system of claim 1, wherein said subscriber data includes an audio data, a PCM data, a MPEG data and a PCS data.

3. The system of claim 1, wherein said ATM switching unit includes:
   a plurality of link interface units connected with the high speed link and matching with the plurality of nodes; and
   an ATM switch formed of an ATM cell switching chip for reading a header information of the ATM cell inputted through one of the link interface units.

4. The system of claim 1, wherein said link interface unit includes aSTM-1 SONET framer.

5. An ATM (Asynchronous Transfer Mode) cell switching system, comprising:
   a plurality of nodes each connected between a highway transmitting a subscriber data and a high speed link which includes an ATM transmission line, and each implementing a converting operation between the subscriber data and an ATM cell; and
   an ATM switching unit for receiving an ATM cell from one of the nodes through the high speed link, judging a destination based on a header information, and routing the ATM cell to another one of the nodes,
   wherein each node includes a cell converting unit for converting subscriber data into a cell or cell into subscriber data, and
   wherein said cell converting unit includes:
      a SPC (Serial-to-Parallel Converter) for converting a subscriber data into a 8-bit parallel data;
      a Tx_Highway buffer for storing an output data from the SPC;
      a Tx_Cell buffer;
      a Tx_FIFO;
      a PCC (PCM-to-Cell Converter) for reading a data from the Tx_Highway buffer by 4-byte and storing the thusly read data into the Tx_Cell buffer in accordance with a highway number and a channel number;
      a Rx_FIFO;
      a Rx_Cell buffer;
      a Rx_Highway buffer;
      a CPC (Cell-to-PCM converter) for storing a 4-byte data read from the Rx_Highway buffer or a subscriber data cell received through the Rx_FIFO into the Rx_Highway buffer; and
      a PSC (Parallel-to-Serial Converter) for reading a parallel data from the Rx_Highway buffer and converting the thusly read data into a serial data.

6. The system of claim 5, wherein said Tx_Highway buffer and Rx_Highway buffer are divided into two groups, whereby one of the PCC and CPC accesses a group 2 while one of the SPC and PSC is accessing a group 1.

7. The system of claim 5, wherein said CPC reads a 4Byte data from the Rx_Cell buffer and stores the thusly read data into the Rx_Highway buffer in accordance with a highway number and a channel number when a subscriber call is a global call, and judges a highway number and a channel number based on a header information of the cell inputted through the Rx_FIFO and stores the input cell into the Rx_Highway buffer in accordance with a judged highway number and channel number when the subscriber call is a global call.

8. An ATM (Asynchronous Transfer Mode) cell switching system, comprising:
   a plurality of nodes each connected between a highway transmitting a subscriber data and a high speed link which includes an ATM transmission line, and each implementing a converting operation between the subscriber data and an ATM cell; and
   an ATM switching unit for receiving an ATM cell from one of the nodes through the high speed link, judging a destination based on a header information, and routing the ATM cell to another one of the nodes,
   wherein each of said nodes includes:
      a CPU (Central Processing Unit) for judging whether a subscriber call is a local call or a global call;
      a cell converting unit for converting a subscriber data into a cell or cell into a subscriber data;
      a cell switching/multiplexing unit for switching a cell inputted from the cell converting unit to the cell converting unit in the case of a local call, and for multiplexing the packet data cell and then forming an ATM cell in the case of a global call; and
      a link interface unit for outputting the ATM cell from the cell switching/multiplexing unit to the high speed link, and
   wherein said cell switching/multiplexing unit includes:
      a CPU interface;
      a CPU interface memory for storing a message from the CPU therein;
      a SAR (Segmentation And Reassembly) for performing a converting operation between the message and the packet data cell;
      a cell converting unit interface for interfacing a subscriber data cell in accordance with a call judgment information;
      a cell multiplexing/demultiplexing unit for multiplexing/demultiplexing a cell from the cell converting unit interface and a packet data cell from the SAR; and
      a Tx_Link interface and a Rx_Link interface for interfacing the cell multiplexing/demultiplexing unit and the link interface unit.

9. The system of claim 8, wherein said SAR divides a message stored in the CPU interface memory into messages of 48-byte and converts the thusly divided messages into a packet data cell for thereby forming a message by assembling the packet data cell.

10. The system of claim 8, wherein said cell converting unit interface switches a cell from the cell converting unit to the cell converting unit in the case of the local call and passes the same or transmits only subscriber data cells among the ATM cells from the link interface unit to the cell converting unit in the case of the global call.

11. The system of claim 8, wherein said cell multiplexing/demultiplexing unit multiplexes a cell from the cell converting unit interface and a packet data cell from the SAR for thereby forming an ATM cell and demultiplexes an ATM cell from the link interface unit to a subscriber data cell and a packet data cell.

12. An ATM cell switching system, comprising:
   a plurality of PCM highways which include TDM transmission lines;
   a plurality of nodes for converting audio data from respective ones of the PCM highways into an ATM cell or the ATM cell into the audio data;
   a high speed link which includes an ATM transmission line; and
   an ATM switching unit, connected with the plurality of nodes though the high speed link, for judging a destination based on a header information of the ATM cell outpur from the nodes and routing a subscriber call, wherein each of the nodes further includes:
- a CPU for judging whether a subscriber call is a local call or a global call;
- a cell converting unit for converting the audio data from respective ones of the PCM highways into the ATM cell or the ATM cell into the audio data;
- a cell switching/multiplexing unit for switching an audio data cell from the cell converting unit to the cell converting unit in the case of the local call and for multiplexing the audio data cell for forming the ATM cell in the case of the global call; and
- a link interface unit for outputting an ATM cell from the cell switching/demultiplexing unit to a high speed link.

13. The system of claim 12, wherein said ATM switching unit includes:
- a plurality of link interface units matching with the plurality of nodes; and
- an ATM switch for judging a destination based on a header information of the ATM cell inputted through the link interface unit and routing to a destination node.

14. The system of claim 13, wherein said ATM switch judges a destination by reading a VCI (Virtual Channel Indicator) from the header.

15. The system of claim 12, wherein said cell converting unit includes:
- a SPC for converting an audio data into a parallel data;
- a Tx_Highway buffet for storing an output data from the SPC thereinto;
- a Tx_Cell Buffer;
- a Tx_FIFO;
- a PCC for reading a data from the Tx_Highway buffer and storing the thusly read data into the Tx_Cell buffer in accordance with a highway number and a channel number,
- a Rx_FIFO;
- a Rx_Cell buffer;
- a Rx_Highway buffer;
- a CPC for storing a data read from the Rx_Cell buffer into the Rx_Highway buffer in accordance with a highway number and a channel number in the case of the local call and for storing an audio data cell into the Rx_Highway buffer in accordance with a highway number and a channel number judged based on a header information of an audio data cell received through the Rx_FIFO in the case of the global call; and
- a PSC for reading a parallel data from the Rx_Highway buffer and converting the thusly read parallel data into a serial data.

16. The system of claim 12, wherein said cell switching/multiplexing unit includes:
- a CPU interface;
- a CPU interface memory for storing a message from the CPU thereinto;
- a SAR for dividing a message stored in the CPU interface memory, converting the thusly divided messages into a packet data cell and forming a message by assembling the packet data cell;
- a cell converting unit interface for switching an audio data cell from the cell converting unit to the cell converting unit again in the case of a local call and for outputting the audio data cell to the link interface unit or transmitting only an audio data cell among the ATM cell from the link interface unit to the cell converting unit in the case of the global call;
- a cell multiplexing/demultiplexing unit for multiplexing an audio data cell from the cell converting unit interface and a packet data cell from the SAR for thereby forming an ATF cell and demultiplexing the ATM cell from the opposite side of the node to an audio data cell and a packet data cell; and
- a Tx_Link interface and a Rx_Link interface for interfacing the cell multiplexing/demultiplexing unit and the link interface unit.

17. An ATM (Asynchronous Transfer Mode) cell switching system, comprising:
- a plurality of nodes each connected between a highway transmitting a subscriber data and a high speed link which includes an ATM transmission line, and each implementing a converting operation between the subscriber data and an ATM cell; and
- an ATM switching unit for receiving an ATM cell from one of the nodes through the high speed link, judging a destination based on a header information, and routing the ATM cell to another one of the nodes,
- wherein each node includes a cell converting unit for converting subscriber data into a cell or cell into subscriber data, said cell converting unit including:
  - a first converter for converting subscriber data into n-bit parallel data;
  - a first buffer for storing output data from the first converter;
  - a PCC (PCM-to-Cell Converter) for reading data from the first buffer and storing the read data in accordance with at least one of a highway number and a channel number;
  - a second buffer for storing k-byte data read from one of a highway or a subscriber data cell; and
  - a second converter for converting parallel data derived from said k-byte data in the second buffer into serial data.

18. The system of claim 1, wherein the cell converting unit is connected with 32 Tx_Highways and 32 Rx_Highways of IDM.

19. The system of claim 12, wherein the cell converting unit is connected with 32 Tx_Highways and 32 Rx_Highways of IDM.

* * * * *